(12) United States Patent
Cannon et al.

(10) Patent No.: US 6,760,413 B2
(45) Date of Patent: *Jul. 6, 2004

(54) DISPLAY OF CALL RELATED INFORMATION REGARDING A CALLED PARTY

(75) Inventors: Joseph M. Cannon, Harleysville, PA (US); James A. Johanson, Mucungie, PA (US)

(73) Assignee: Agere Systems Inc., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,159

(22) Filed: Feb. 16, 1999

(65) Prior Publication Data

US 2003/0035520 A1 Feb. 20, 2003

(51) Int. Cl.[7] .............................................. H04M 1/64
(52) U.S. Cl. ..................... 379/88.19; 379/52; 379/93.01
(58) Field of Search ........................ 379/88.11, 93.23, 379/106.03, 93.01, 178, 202.01, 352, 372, 142.08, 69, 67.1, 91.01, 88.19, 80, 88.02, 142.01, 387.01, 88.01, 88.2, 52; 707/10; 455/445

(56) References Cited

U.S. PATENT DOCUMENTS

| | | | | |
|---|---|---|---|---|
| 4,602,129 A | * | 7/1986 | Matthews et al. ............ 379/84 |
| 5,278,894 A | * | 1/1994 | Shaw ....................... 379/88.19 |
| 5,333,180 A | * | 7/1994 | Brown et al. .................. 379/79 |
| 5,404,400 A | * | 4/1995 | Hamilton ..................... 379/80 |
| 5,752,191 A | * | 5/1998 | Fuller et al. ................ 455/445 |
| 5,805,682 A | * | 9/1998 | Voit et al. .............. 379/142.16 |
| 5,836,009 A | * | 11/1998 | Diamond et al. ......... 379/93.23 |
| 5,872,834 A | * | 2/1999 | Teitelbaum ............ 379/110.01 |
| 5,946,684 A | * | 8/1999 | Lund ........................... 707/10 |
| 6,026,152 A | * | 2/2000 | Cannon et al. ......... 379/142.06 |
| 6,141,339 A | * | 10/2000 | Kaplan et al. .............. 370/352 |
| 6,208,713 B1 | * | 3/2001 | Rahrer et al. ............ 379/88.01 |
| 6,269,159 B1 | * | 7/2001 | Cannon et al. ......... 379/202.01 |
| 6,292,543 B1 | * | 9/2001 | Cannon et al. ......... 379/102.01 |
| 6,304,642 B1 | * | 10/2001 | Beamish et al. ........ 379/142.01 |
| 6,327,347 B1 | * | 12/2001 | Gutzmann ................. 379/88.2 |
| 6,366,670 B1 | * | 4/2002 | Davis et al. ........... 379/387.01 |
| 6,393,122 B1 | * | 5/2002 | Belzile ....................... 379/258 |

* cited by examiner

Primary Examiner—Fan Tsang
Assistant Examiner—Gerald Gauthier
(74) Attorney, Agent, or Firm—William H. Bollman (57) ABSTRACT

Call related information regarding a called party (i.e., callee information) is provided back to the calling party using a telephone capable of receiving information regarding a called party back from either the central office, from the called party's telephone itself, or in limited applications from a local identification module capable of confirming the identity of the called party based on the dialed telephone number. The receiving telephone may be capable of determining or storing local call related information for transmission back to select callers. The callee ID information may be transmitted using conventional FSK techniques, e.g., between the second and third rings, to avoid collision with conventional transmissions of caller ID information.

30 Claims, 6 Drawing Sheets

DISPLAY OF CALL RELATED INFORMATION REGARDING A CALLED PARTY

BACKGROUND OF THE INVENTION

1. Field of the Invention

This invention relates generally to a telephone system which displays call related information of a person called. More particularly, it relates to a telephone system which receives from a telephone line and displays call related information regarding a called party for confirmation to the calling party.

2. Background of Related Art

The use of call related information services, e.g., Caller ID, to provide call related information regarding a calling party (e.g., the household name and/or telephone number) is known. For instance, using Caller ID, a calling party's telephone number and/or household name is transmitted by the telephone company to the called telephone for display to the calling party so that the called party can know who is calling, even before they answer the telephone.

Using Type I Caller ID services, call related information is transmitted by the telephone company during the silent interval between the first two rings to a telephone in an on-hook condition. On the other hand, Type II Caller ID services provide call related information to a telephone in an off-hook condition. One example service is commonly known as Caller ID/Call Waiting (CIDCW). Of course, other standards exist as well. For instance, in the United Kingdom, call related information is transmitted prior to the first ring.

Figure 6:
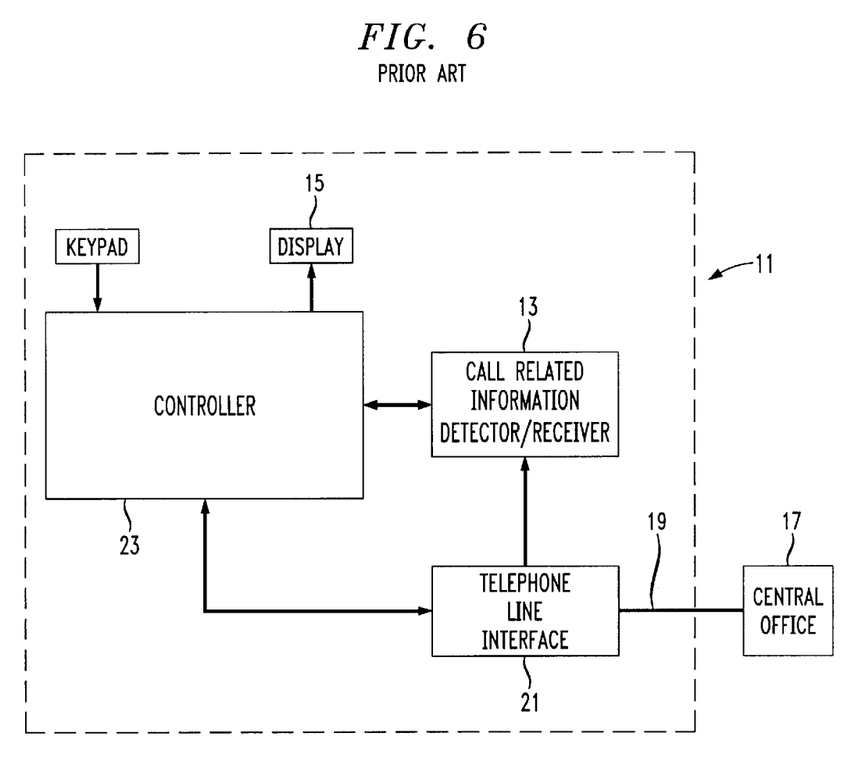
FIG. 6 illustrates a conventional telephone system capable of detecting and receiving conventional call related information for incoming calls only.

One example of a conventional telephone system having the capability to receive call related information, e.g., Caller ID information is illustrated in FIG. 6.

In particular, in FIG. 6, a telephone system 11 includes a call related information detector/receiver 13 adapted to receive a household name, telephone number, and/or other call related information. The received call related information is stored for archival purposes, and/or displayed on an alphanumeric LCD display 15. The call related information is received from the telephone company central office 17 over the telephone line 19 via a telephone line interface 21.

Typically, the telephone system 11 includes a controller 23 to control the functions of the telephone system 11. The controller 23 is typically a suitable processor, e.g. a microprocessor, a digital signal processor, or a microcontroller.

Unfortunately, conventional call related services provide call related information only to one party, i.e., to the called party. Conventional systems which provide call related information presume that the calling party knows who they called. This presumption may not be sufficient at times.

For instance, the calling party can only presume that they dialed the correct telephone number, and that the intended party (and/or the intended extension) answers the called telephone. However, this presumption can at times lead to undesirable consequences, particularly if the party who is actually called is not the intended called party.

Moreover, a called telephone (such as a home telephone) often has a number of extensions throughout the home and/or is often accessible by a number of individuals. In such a case, the caller has no way of knowing exactly who answered an incoming call except by asking the called person who they are, or by recognizing the answering person after they speak a bit.

The provision of callee related data (i.e., the telephone number and/or name associated with a called party) has been known in private branch exchange (PBX) equipment. In such systems, co-workers can see the name of the party called on a display after dialing their assigned extension. Such systems presume the typical office type environment wherein each user has their own unique extension.

PBX and similar local systems typically provide callee related information to their users' telephones using separate data communication lines, and not through the telephone line interface which otherwise provides an analog voice communication path between parties. These separate (and often proprietary) data communication lines are not provided through a typical PSTN or cellular telephone call. Thus, even PBX systems which provide callee related information for its own local users via separate data lines do not provide callee related information for parties outside of those serviced by the PBX, e.g., through the PSTN (or cellular telephone network).

Accordingly, there exists a need for a telephone system which can overcome the presumption a calling party must accept that a telephone call to someone using a public network (e.g., the PSTN or the cellular telephone network) is answered by the desired called party.

SUMMARY OF THE INVENTION

In accordance with the principles of the present invention, a telephone system capable of initiating a telephone call to a called party comprises a telephone line interface. An outgoing call related information detector/receiver adapted to receive call related information regarding a party called using the telephone system via the telephone line interface.

A method of providing call related information regarding a called party back to a calling party in accordance with another aspect of the present invention, comprises initiating a telephone call over a telephone line to a called party. Call related information regarding the called party is received back from the telephone line.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a telephone system which receives and displays call related information regarding a called party back to a calling party.

In accordance with the principles of the present invention, call related information regarding the called party is returned to the caller for display, either while an outgoing telephone call is ringing, or after the called party answers the incoming telephone call. The called party or "callee" related information may be provided by the central office using a database established for otherwise conventional call related information services (e.g., Caller ID services), or may be provided by the called party's telephone equipment via the telephone line after the telephone call has been established.

Called party related information provided by the called party's telephone equipment may include very detailed information or may be quite basic, depending upon the particular application. For instance, basic information such as the telephone number of the called telephone may be returned by the called party to the caller via conventional FSK techniques used in the transmission of conventional Caller ID information.

Alternatively, the callee related information may be transmitted back to the calling party using ADSL or related data subscriber loop techniques such as HDSL, sometimes generally referred to collectively as xDSL. Using ADSL (or related techniques), the callee related information may be transmitted back to the calling party at any time, even after the telephone call has been established, without affecting the underlying voice conversation.

Other unique information may be provided, such as an identity of which extension on a common telephone line answered the telephone call. If more than one extension is picked up, multiple called party related information may be transmitted to the caller. More sophisticated information such as fingerprint or voice recognition confirmation information may be provided by the called party's customer premises equipment (e.g., telephone) using, e.g., a computer system connected to the called party's telephone.

In accordance with another aspect of the present invention, the caller's telephone system has a local user recognition module which displays individualized information regarding the identity of the called party based on, e.g., a dialed telephone number.

Figure 1:
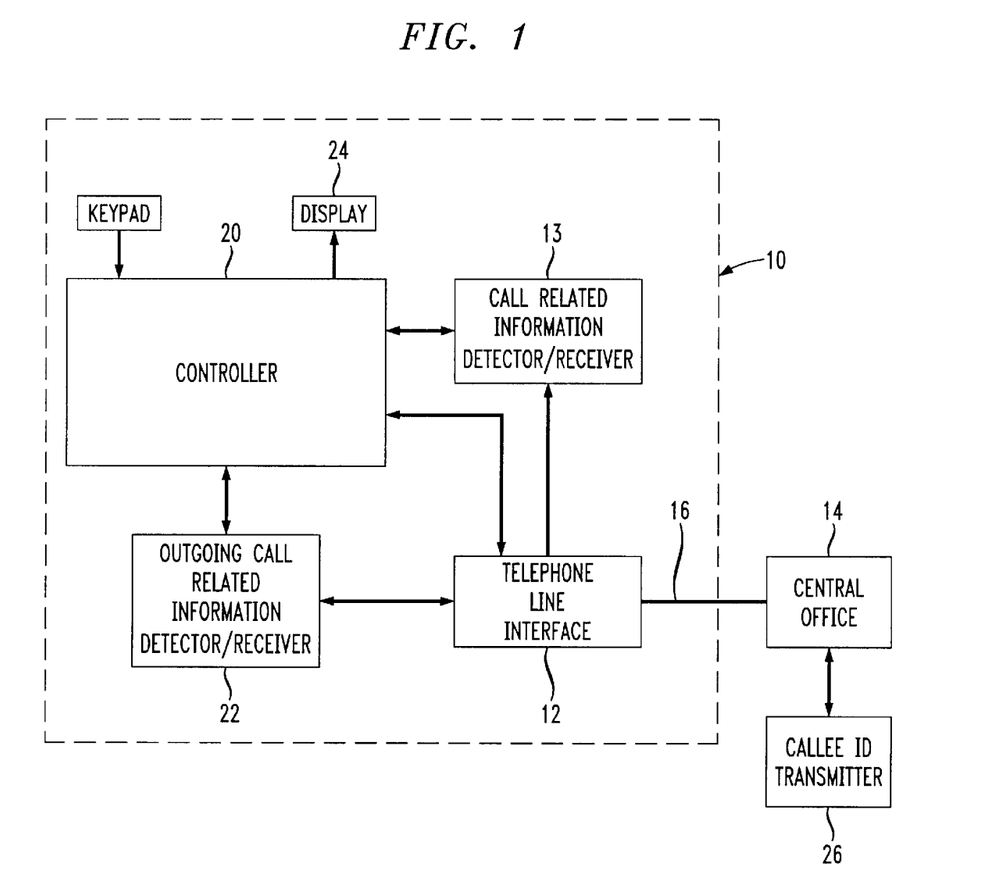
FIG. 1 is a block diagram illustrating a telephone system which is capable of displaying call related information regarding a called party received back from the central office, in accordance with the principles of the present invention.

FIG. 1 illustrates a telephone system, indicated generally at 10, capable of providing called party information back to the calling party.

In the embodiment of FIG. 1, the callee ID telephone 10 includes at least one telephone line interface 12 for interconnection with a telephone company central office 14 via a telephone line 16. The callee ID telephone 10 further includes a controller 20 to control the functions of the callee ID telephone 10. The controller 20 may be any suitable processor selected based on the particular application, e.g., a suitable microprocessor, digital signal processor (DSP), or microcontroller.

A call information detector/receiver 13 is connected to the telephone line interface 12 to receive call related information with respect to an incoming telephone call, e.g., Caller ID information. The call related information can include, e.g., a telephone number, a personal name and/or a business name associated with the incoming telephone call or conference call participant.

However, in accordance with the principles of the present invention, the callee ID telephone 10 further includes an outgoing call related information detector/receiver 22 adapted to direct the detection and reception of call related information regarding a called party back to a calling party using the callee ID telephone 10.

A display device 24 displays the call related information, either relating to an incoming call or relating to an outgoing call, based on the status of the callee ID telephone 10. For instance, if an outgoing call is being placed using the callee ID telephone 10, the display may be updated in coordination with the outgoing call related information detector/receiver 22 and/or the controller 20. However, when an outgoing call is not being placed, the display may be used to display an archival history of calls (outgoing and/or incoming) as stored in appropriate non-volatile memory associated with the controller 20.

The outgoing call related information detector/receiver 22 utilizes conventional telephonic data transmission techniques, e.g., FSK techniques currently used in the transmission of caller ID information, for the reception of call related information regarding a called party.

For instance, frequency shift keying (FSK) techniques preceded by a CAS tone may be utilized to transmit call related information regarding the called party using a callee ID transmitter 26 maintained at the central office 14. Thus, in the embodiment of the present invention shown in FIG. 1, the telephone company central office 14 provides call related information regarding the called party back to the calling party from the callee ID telephone 10 using frequency shift keying (FSK).

In operation, upon connection of the telephone call between the calling party and the called party, the calling party receives a download of data from the telephone central office 14 corresponding to the call related information regarding the called party using, e.g., FSK techniques between the first and second rings.

If a data transmission technique is utilized wherein the call related information data is downloaded to the calling party after the telephone call has been established, off-hook techniques similar to Type II Caller ID/Call Waiting services can be implemented wherein the earpiece of both party's telephones are preferably muted or otherwise suppressed to reduce any possible annoyance to the parties caused by audible frequencies in the transmission of the call related information regarding the called party. Once received, the call related information regarding the called party is displayed on the calling party's display 24, and may also be stored for archival purposes in a suitable non-volatile memory.

Figure 2:
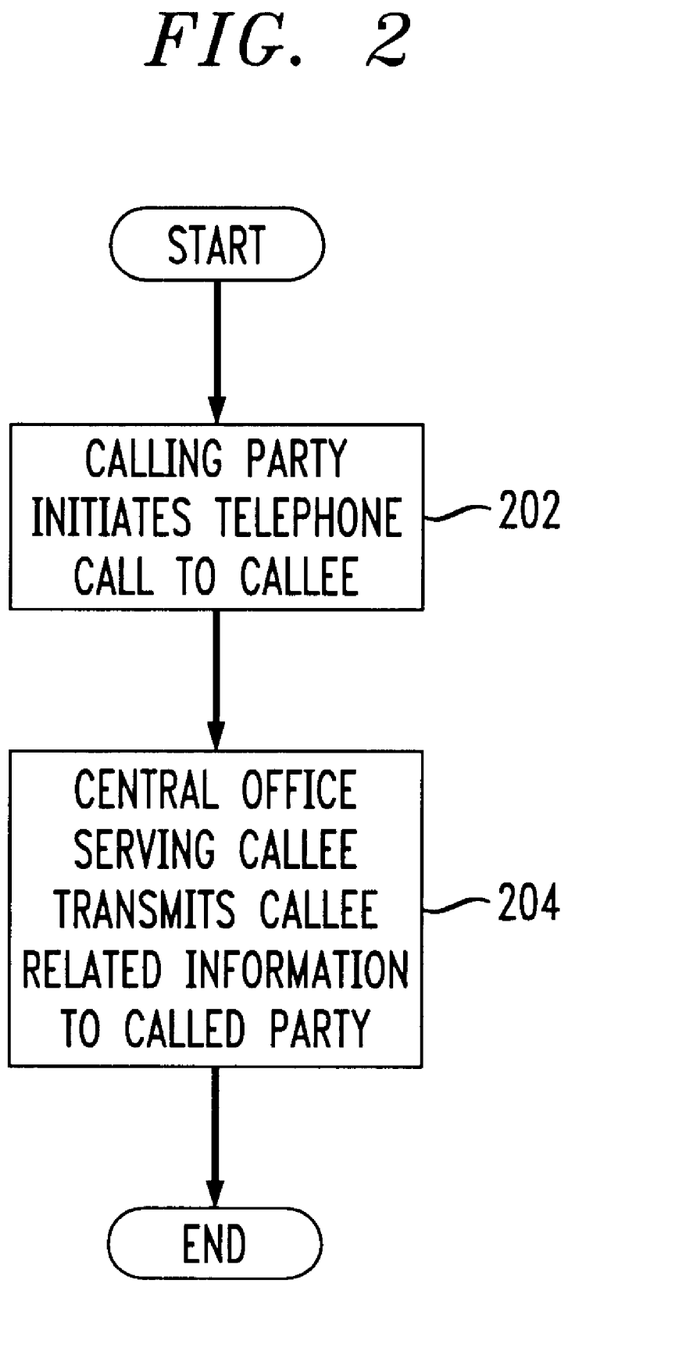
FIG. 2 is a flow chart illustrating an exemplary process by which a telephone central office transmits call related information regarding a called party back to the calling party, in accordance with the principles of the present invention.

FIG. 2 illustrates a basic flow chart showing an exemplary process by which the callee ID telephone 10 of FIG. 1 receives back and displays call related information regarding the called party.

With reference to FIG. 2, in step 202, a calling party initiates a telephone call to a called party.

In step 204, call related information regarding the called party is determined by the central office 14 based on a database otherwise conventionally maintained with respect to known caller ID or similar services, and downloaded back to the calling party by the callee ID transmitter 26.

Figure 3:
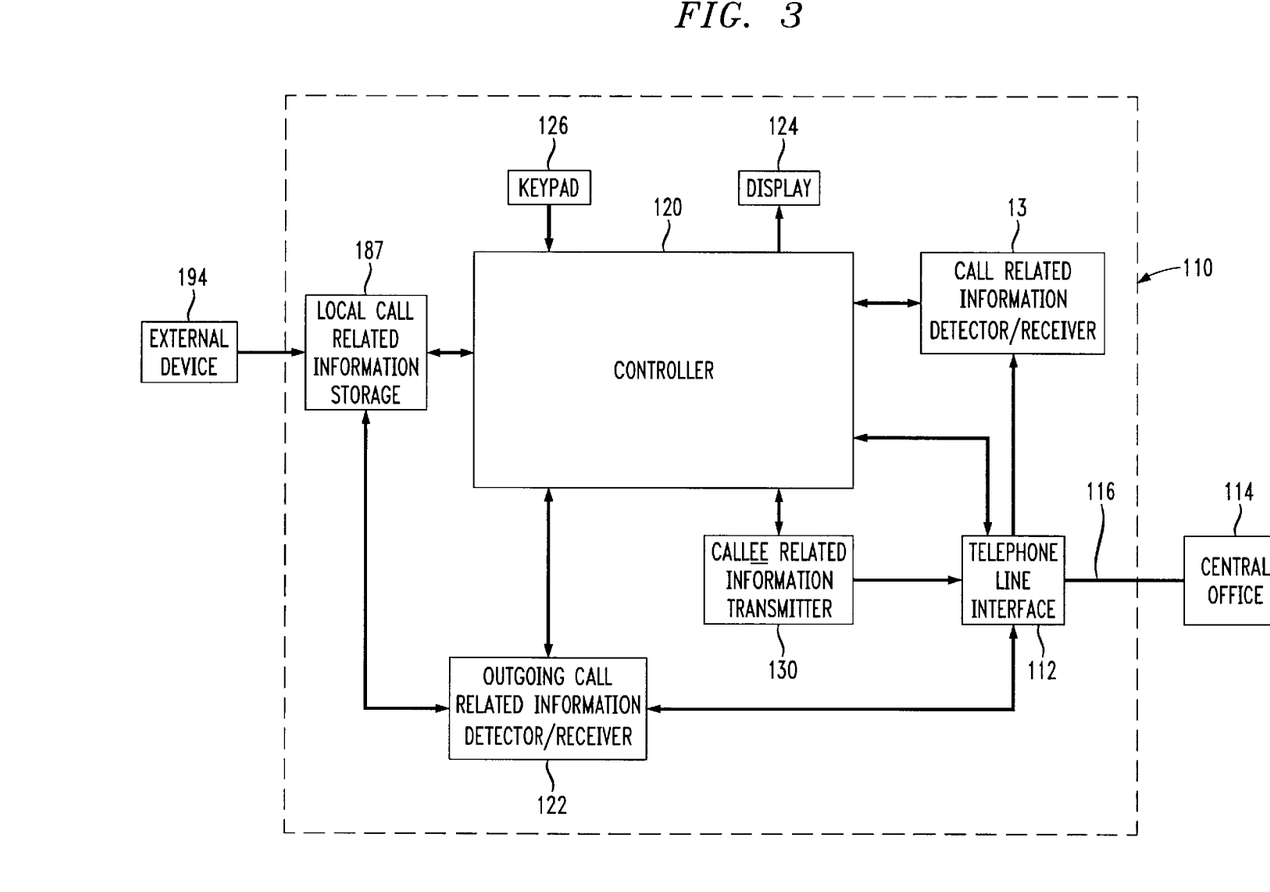
FIG. 3 is a block diagram illustrating another embodiment of a telephone system having an outgoing call related information detector/receiver for receiving call related information back from the called party, in accordance with the principles of the present invention.

FIG. 3 illustrates another embodiment of the present invention of a callee ID telephone 110 adapted to transmit specific call related information regarding a user back to a calling party.

In particular, in FIG. 3, as was the case in the embodiment shown in FIG. 1, the telephone system 110 includes at least one telephone line interface 112 for interconnection with a telephone company central office 114 via a telephone line 116. The telephone system 110 further includes a controller 120 to control the functions of the telephone system 110. A call related information detector/receiver 13 is connected to the telephone line interface 112 to receive call related information with respect to an incoming telephone call, e.g., Caller ID information. The telephone system 10 may be capable of displaying received call related information as described with respect to FIG. 1, but the focus of the embodiment shown in FIG. 3 is to emphasize that local call related information 187 may be transmitted by the called party's telephone system 110 itself rather than from the central office 14.

Accordingly, the embodiment shown in FIG. 3 includes a callee related information transmitter 130 capable of transmitting local call related information 187 using conventional FSK techniques at an appropriate time, e.g., between the second and third ring signals.

Preferably, the local call related information 187 will be transmitted by the callee related information transmitter 130 at a time different from that being received by the call related information detector/receiver 13. Thus, in the case of Caller ID type services which transmit call related information regarding a calling party between the first two rings, the local call related information 187 regarding the called telephone may be transmitted, e.g., between the second and third rings.

Upon connection of a telephone call between the calling party and the called party, the callee related information transmitter 130 transmits the local call related information 187 regarding some aspect of the called party back to the calling party.

Suitable local call related information 187 may include, but is in no way limited to, the name of the room that the extension is located in (e.g., bedroom), the name of the family or business member assigned to use the called telephone 110, the time of day or other local information regarding the called telephone 110, etc.

Moreover, the local call related information 187 may include information provided to the callee ID telephone 210 by an external device 194 using, e.g., a serial port interface (not shown) between the external device and the controller 120. Examples of external devices 194 include, but are in no way limited to, devices capable of fingerprint identification, voice recognition, etc., to specifically identify the person who answered the called telephone.

If desired, the called party can deactivate the callee related information transmitter 130 via input of an authorized security code into the keypad 126 prior to answering the telephone call from the calling party so that the locally determined call related information regarding the called party will not be transmitted back to the calling party, to allow the user of the callee ID telephone 110 to selectably allow the user to maintain the privacy of certain information contained in the locally-determined call related information.

Local call related information may also be restricted by the outgoing call related information detector/receiver by first comparing incoming call related information received from the calling party to a predetermined approved list of callers. If a match is found with an approved caller as determined by the received call related information, then the outgoing call related information detector/receiver 22 can transmit the local call related information back to the caller at the appropriate time, e.g., between the second and third rings.

Figure 4:
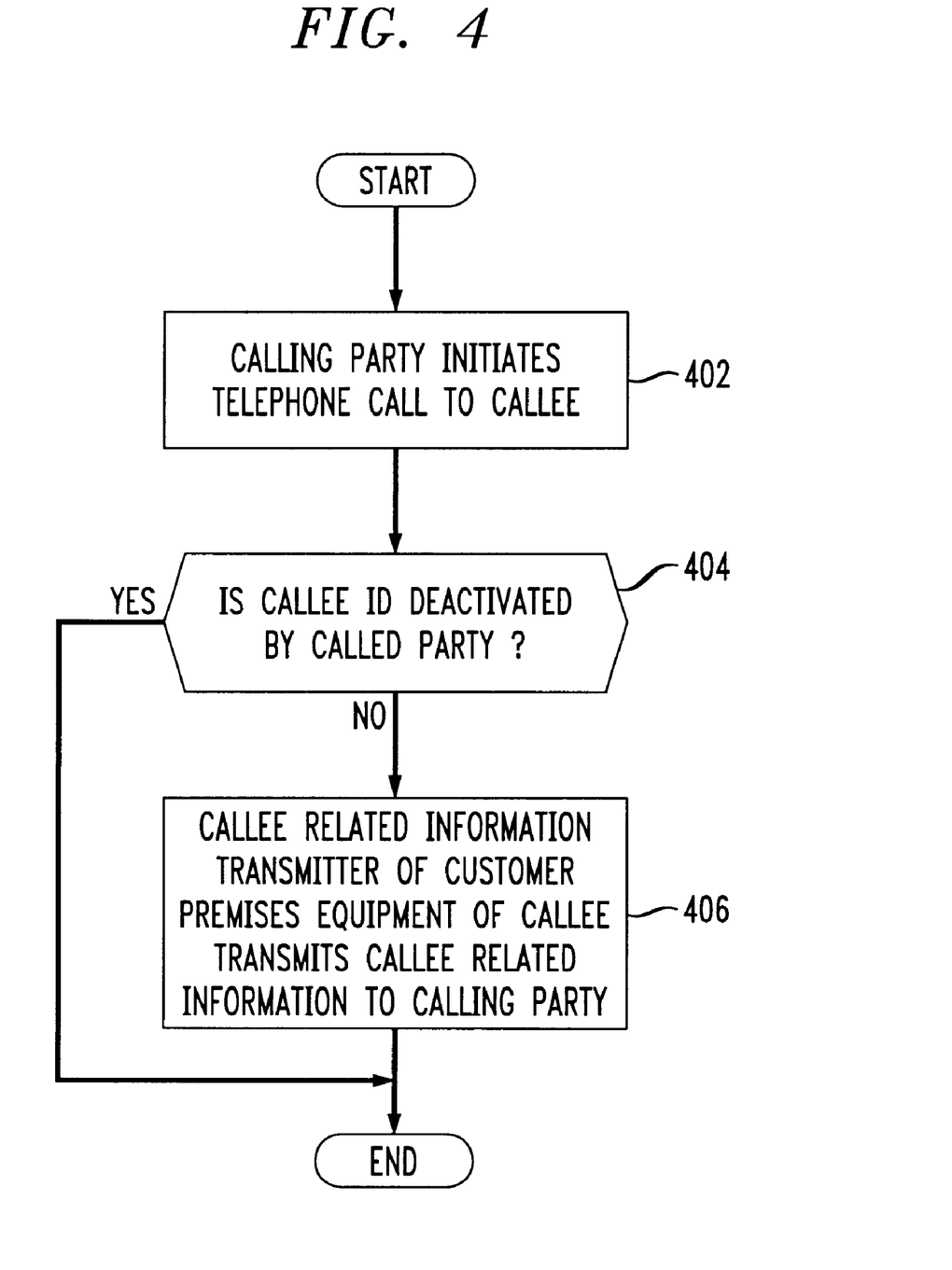
FIG. 4 is a flow chart illustrating an exemplary process by which the telephone of the called party transmits call related information back to a calling party, in accordance with the principles of the present invention.

FIG. 4 illustrates a basic flow chart showing an exemplary process by which the callee ID telephone 110 of FIG. 3 transmits local call related information back to the calling party.

In particular, in step 402 of FIG. 4, a calling party initiates a telephone call to a called party.

In decision step 404, it is determined whether the callee related information transmitter 130 is deactivated by the called party to prevent local call related information regarding the called party from being transmitted back to the calling party. If deactivated, the process ends.

However, as shown in step 406, if the callee related information transmitter 130, is activated and has local call related information to transmit back to the calling party, the callee related information transmitter 130 may transmit the local call related information regarding the called party back to the calling party.

Figure 5:
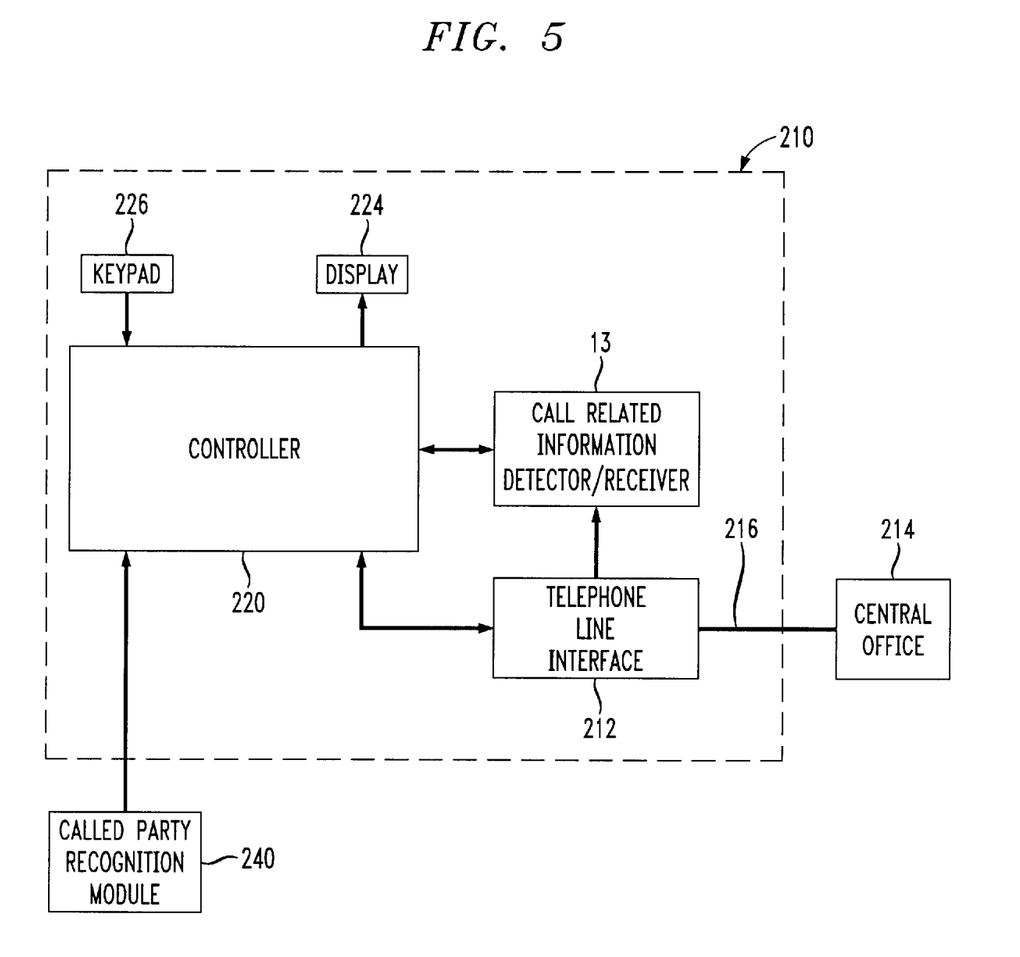
FIG. 5 is a block diagram illustrating another embodiment of a telephone system which displays call related information regarding a called party back to the calling party using a local called party recognition module to provide localized information confirming the identity of the called party, in accordance with the principles of the present invention.

FIG. 5 illustrates yet another embodiment of the present invention of a callee ID telephone 210 capable of providing limited confirmation to a calling party that an intended party was indeed called. The embodiment of FIG. 5 relies upon a called party recognition module 240 local to the calling party's telephone 210 (and invisible to the called party and to the central office 214).

In particular, the callee ID telephone 210 contains similar components to those callee ID telephones 10, 110 shown in FIGS. 1 and 3, respectively. However, the callee ID telephone 210 shown in FIG. 5 includes a local called party recognition module 240 capable of locally determining who was called, based on a lookup table maintained in non-volatile memory.

The called party recognition module 240 may be integrated within the callee ID telephone 210, or may have software and/or hardware which resides external to the callee ID telephone 210.

While the invention has been described with reference to the exemplary embodiments thereof, those skilled in the art will be able to make various modifications to the described embodiments of the invention without departing from the true spirit and scope of the invention.

What is claimed is:

1. A telephone system capable of initiating a telephone call to a called party, comprising:

a single telephone line interface connecting directly to a central office of a telephone company;

an outgoing call related information detector and receiver adapted to receive call related information regarding a party called directly from a called party's telephony equipment using said telephone system via said single telephone line interface; and a decoder adapted to decode said call related information for a determination of an identity of said called party.

2. The telephone system capable of initiating a telephone call to a called party according to claim 1, wherein:

said call related information is received using frequency shift keying techniques.

3. The telephone system capable of initiating a telephone call to a called party according to claim 1, wherein:

said outgoing call related information detector/receiver is adapted to receive said call related information while a telephone call is being established with said called party.

4. The telephone system capable of initiating a telephone call to a called party according to claim 1, wherein:

said outgoing call related information detector/receiver is adapted to receive said call related information after a telephone call is established with said called party.

5. The telephone system capable of initiating a telephone call to a called party according to claim 1, further comprising:

a display adapted to display said call related information regarding said called party.

6. The telephone system capable of initiating a telephone call to a called party according to claim 1, wherein:

said call related information is transmitted from a central office.

7. The telephone system capable of initiating a telephone call to a called party according to claim 1, wherein:

said call related information is transmitted from customer premises equipment associated with said called party's telephone.

8. The telephone system capable of initiating a telephone call to a called party according to claim 1, wherein:

said call related information includes fingerprint confirmation information.

9. The telephone system capable of initiating a telephone call to a called party according to claim 1, wherein:
said call related information includes voice confirmation information.

10. The telephone system capable of initiating a telephone call to a called party according to claim 1, wherein:
said call related information includes an identity of a telephone extension answering said telephone call.

11. The telephone system capable of initiating a telephone call to a called party according to claim 1, wherein:
said call related information is Caller ID information regarding said called party.

12. The telephone system capable of initiating a telephone call to a called party according to claim 1, further comprising:
a callee related information transmitter adapted to transmit over an incoming telephone line to said called party call related information regarding an identity of said called party's telephone used to answer an incoming telephone call.

13. The telephone system capable of initiating a telephone call to a called party according to claim 12, wherein:
said callee related information transmitter is located with said called party's telephone.

14. The telephone system capable of initiating a telephone call to a called party according to claim 12, wherein:
said callee related information transmitter is located with a central office.

15. The telephone system capable of initiating a telephone call to a called party according to claim 12, further comprising:
means for deactivating said callee related information transmitter to prevent transmission of said call related information regarding said called party back to said calling party.

16. The telephone system capable of initiating a telephone call to a called party according to claim 12, further comprising:
a user recognition apparatus adapted to transmit individualized call related information regarding a specific person using said called party's telephone.

17. The telephone system capable of initiating a telephone call to a called party according to claim 16, wherein said individualized call related information includes at least one of:
fingerprint identification of said specific person using said called party's telephone; and
voice recognition identification of said specific person using said called party's telephone.

18. A method of providing call related information regarding a called party back to a calling party, comprising:
initiating a telephone call to a called party over a single telephone line connected directly to a central office of a telephone company;
receiving directly back from a called party's telephony equipment call related information regarding said called party; and
decoding said call related information to determine an identity of said called party.

19. The method of providing call related information regarding a called party back to a calling party according to claim 18, wherein:
said call related information is transmitted using frequency shift keying techniques.

20. The method of providing call related information regarding a called party back to a calling party according to claim 18, wherein:
said call related information is received back from a central office.

21. The method of providing call related information regarding a called party back to a calling party according to claim 18, wherein:
said call related information is received back from said called party.

22. The method of providing call related information regarding a called party back to a calling party according to claim 18, wherein:
said call related information transmitted is Caller ID information regarding said called party.

23. The method of providing call related information regarding a called party back to a calling party according to claim 18, further comprising:
authorizing transmission of call related information regarding said called party on a call-by-call basis.

24. Apparatus for providing call related information regarding a called party back to a calling party, comprising:
means for initiating a telephone call to a called party over a single telephone line connected directly to a central office of a telephone company;
means for receiving directly back from a called party's telephony equipment call related information regarding said called party; and
means for decoding said call related information to determine an identity of said called party.

25. The apparatus for providing call related information regarding a called party back to a calling party according to claim 24, wherein:
said call related information is transmitted using frequency shift keying techniques.

26. The apparatus for providing call related information regarding a called party back to a calling party according to claim 24, wherein:
said call related information is transmitted using digital subscriber loop techniques.

27. The apparatus for providing call related information regarding a called party back to a calling party according to claim 24, wherein:
said call related information is received back from a central office.

28. The apparatus for providing call related information regarding a called party back to a calling party according to claim 24, wherein:
said call related information is received back from said called party.

29. The apparatus for providing call related information regarding a called party back to a calling party according to claim 24, wherein:
said call related information transmitted is Caller ID information.

30. The apparatus for providing call related information regarding a called party back to a calling party according to claim 24, further comprising:
means for authorizing transmission of call related information regarding said called party on a call-by-call basis.

* * * * *